United States Patent
Asahi et al.

(10) Patent No.: US 12,355,087 B2
(45) Date of Patent: Jul. 8, 2025

(54) ELECTROCHEMICAL OXYGEN REDUCTION CATALYST

(71) Applicant: NATIONAL INSTITUTE OF ADVANCED INDUSTRIAL SCIENCE AND TECHNOLOGY, Tokyo (JP)

(72) Inventors: Masafumi Asahi, Ikeda (JP); Shin-Ichi Yamazaki, Ikeda (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 639 days.

(21) Appl. No.: 17/774,699

(22) PCT Filed: Oct. 28, 2020

(86) PCT No.: PCT/JP2020/040483
§ 371 (c)(1),
(2) Date: May 5, 2022

(87) PCT Pub. No.: WO2021/090746
PCT Pub. Date: May 14, 2021

(65) Prior Publication Data
US 2022/0416258 A1 Dec. 29, 2022

(30) Foreign Application Priority Data
Nov. 8, 2019 (JP) ................... 2019-203430

(51) Int. Cl.
H01M 4/90 (2006.01)
H01M 4/86 (2006.01)
H01M 12/06 (2006.01)

(52) U.S. Cl.
CPC ....... *H01M 4/9058* (2013.01); *H01M 4/9008* (2013.01); *H01M 4/9083* (2013.01); *H01M 12/06* (2013.01); *H01M 2004/8689* (2013.01)

(58) Field of Classification Search
None
See application file for complete search history.

(56) References Cited

U.S. PATENT DOCUMENTS

| | | | | |
|---|---|---|---|---|
| 10,026,970 B1 * | 7/2018 | Al-Enizi | ............ | H01M 8/1018 |
| 2009/0305103 A1 | 12/2009 | Takekawa et al. | | |
| 2021/0384524 A1 * | 12/2021 | Asahi | .................. | H01M 4/8663 |

FOREIGN PATENT DOCUMENTS

| | | | |
|---|---|---|---|
| CN | 105312087 A | | 2/2016 |
| CN | 105529475 B | | 2/2018 |
| JP | 2006202686 A | | 8/2006 |
| JP | 20060309973 A | | 11/2006 |
| JP | 2008098140 A | | 4/2008 |
| JP | 2011071007 A | | 4/2011 |
| JP | 2011092940 A | | 5/2011 |
| JP | 2018-044135 | * | 3/2018 |
| JP | 2018086640 A | | 6/2018 |
| WO | WO2019/167681 | * | 9/2019 |
| WO | 2019221156 A1 | | 11/2019 |

OTHER PUBLICATIONS

Machine translation of JP 2018-044135A, published on Mar. 22, 2018 (Year: 2018).*
Asahi, M.; Yamazaki, S.-I.; Taguchi, N.; Ioroi, T.-Facile Approach to Enhance Oxygen Reduction Activity by Modification of Platinum Nanoparticles by Melamine-Formaldehyde Polymer, Journal of Electrochemical Society, 166(8), pp. F498-F505, 2019 (Year: 2019).*
Chinese Office Action dated Mar. 6, 2024 for corresponding CN patent application No. 202080075825.3, 10 pages (with English translation).
Extended European Search Report issued in corresponding European Patent Application No. 20886040.3, dated Dec. 16, 2024, 5 pages.
Ashahi et al., "Improvement of ORR activity of Pt catalysts by surface modification of melamine derivatives", The 59th Battery Symposium in Japan, Lecture No. 1H06, 4 pages with English translation.
Asahi et al., "Enhancement of Oxygen Reduction Activity by Modification of Platinum Nanoparticles by Melamine Derivatives", Electrochemical Society of Japan, Aug. 27, 2019, Lecture No. 2H03, 1 page.
International Search Report dated Dec. 15, 2020 for International Application No. PCT/2020/040483, 5 pages including English Translation.

* cited by examiner

*Primary Examiner* — Anca Eoff
(74) *Attorney, Agent, or Firm* — MH2 Technology Law Group, LLP (57) ABSTRACT

Provided is an electrochemical oxygen reduction catalyst comprising platinum-containing nanoparticles and at least one member selected from the group consisting of a specific polymer containing a melamine compound as a monomer and a specific melamine compound, the electrochemical oxygen reduction catalyst having not only high oxygen reduction activity (low overvoltage), but also high durability at 70 to 85° C., which are practical temperature conditions.

15 Claims, 2 Drawing Sheets

ELECTROCHEMICAL OXYGEN REDUCTION CATALYST

CROSS-REFERENCE TO RELATED APPLICATIONS

This application is a U.S. National Stage application of PCT/JP2020/040483 filed 28 Oct. 2020, which claims priority to Japanese Application No. 2019-203430 filed 8 Nov. 2019, the entire disclosures of which are incorporated herein by reference in their entireties.

TECHNICAL FIELD

The present invention relates to an electrochemical oxygen reduction catalyst.

BACKGROUND ART

The spread of polymer electrolyte fuel cells (PEFCs) in the near future is expected due to their compact size and high efficiency, as well as from the viewpoint of global environmental issues.

Polymer electrolytes used in PEFCs are generally highly acidic cation exchange membranes; therefore, an electrode catalyst must act stably under highly acidic conditions. For this reason, platinum or a platinum-containing alloy is currently the only electrode catalyst that is viable for practical use. Accordingly, the price and scarcity of platinum is one of the major factors that raise the cost of the entire system. In particular, the slow oxygen reduction reaction of air electrodes causes high overvoltage, and a large amount of platinum is used to obtain a sufficient reaction rate, which is another factor that raises the cost of the entire system. Furthermore, the low durability of platinum catalysts in air electrodes is another reason why the amount of platinum used is not decreasing. In order to reduce the cost of the entire system, it is strongly required to reduce the amount of precious metal used in air electrodes.

As a method of reducing such a high overvoltage, a method of alloying platinum and a method of using platinum-containing core-shell nanoparticles are known (see, for example, PTL 1). Moreover, a method of reducing overvoltage by modifying the platinum surface with a tetraazaporphyrin compound is also known (see, for example, PTL 2). Further, a method of reducing overvoltage by modifying the platinum surface with a melamine compound etc. is also known (see, for example, NPL 1).

Metal-air batteries are batteries that use zinc, iron, aluminum, or like metals for the anode, and an air electrode for the cathode. These batteries can utilize oxygen in the air as the active material on the cathode side; and their electrical capacity is determined only by their anode capacity, thus achieving high energy density. In a metal-air battery, the reaction on the air electrode (cathode) side is known to be an oxygen reduction reaction during discharge, and an oxygen generation reaction during charge. Accordingly, an air electrode using oxygen as an active material is also used in a metal-air battery, as in a PEFC or the like; thus, the development of a catalyst that is highly active for an oxygen reduction reaction is desired.

CITATION LIST

Patent Literature

PTL 1: JP2011-092940A
PTL 2: JP2018-086640A

Non-Patent Literature

NPL 1: The 59th Battery Symposium in Japan, Lecture No. 1H06

SUMMARY OF INVENTION

Technical Problem

Conventional methods such as those of PTL 1, PTL 2, and NPL 1 show durability at ordinary temperature; however, durability at 70 to 85° C., which are practical temperature conditions, is not sufficient. There is room for the improvement of durability at 70 to 85° C., which are practical temperature conditions.

The present invention was made in view of the above problems, and an object of the present invention is to provide an electrochemical oxygen reduction catalyst having not only high oxygen reduction activity (low overvoltage), but also high durability at 70 to 85° C., which are practical temperature conditions.

Solution to Problem

The present inventors conducted extensive research in light of the above problem. As a result, they found that the above problem can be solved when platinum-containing nanoparticles and at least one member selected from the group consisting of a specific polymer containing a melamine compound as a monomer and a specific thiol melamine compound are contained. The present invention was accomplished by further research based on the above finding. Specifically, the present invention includes the following.

Item 1. An electrochemical oxygen reduction catalyst comprising platinum-containing nanoparticles and at least one member selected from the group consisting of a polymer containing a melamine compound as a monomer and a thiol melamine compound;

the polymer containing a melamine compound as a monomer being a polymer having a repeating unit represented by formula (1):

wherein
$R^8$, $R^9$, $R^{10}$, and $R^{11}$ are the same or different, and represent hydrogen, hydroxy, halogen, substituted or unsubstituted alkyl, substituted or unsubstituted alkenyl, or substituted or unsubstituted aryl, and
$R^{12}$ represents substituted or unsubstituted alkylene, substituted or unsubstituted alkenylene, substituted or unsubstituted cycloalkylene, or substituted or unsubstituted arylene, with the proviso that when none of $R^8$, $R^9$, $R^{10}$, and $R^{11}$ is substituted with sulfonic acid or a derivative group thereof (—$SO_3M$; M represents hydrogen, alkali metal, or $NE_4$), $R^{12}$ represents substituted or unsubstituted arylene; and the thiol melamine compound being a thiol melamine compound represented by formula (2):

(2)

wherein

$R^1$, $R^2$, $R^3$, $R^4$, $R^5$, and $R^6$ are the same or different, and represent hydrogen, hydroxy, halogen, substituted or unsubstituted alkyl, substituted or unsubstituted alkenyl, or substituted or unsubstituted aryl, and $R^7$ represents substituted or unsubstituted alkylene, substituted or unsubstituted alkenylene, substituted or unsubstituted cycloalkylene, or substituted or unsubstituted arylene.

Item 2. The electrochemical oxygen reduction catalyst according to Item 1, wherein at least one member selected from the group consisting of the polymer containing a melamine compound as a monomer and the thiol melamine compound is supported on the platinum-containing nanoparticles.

Item 3. The electrochemical oxygen reduction catalyst according to Item 2, wherein 10 to 80% of the electrochemical active surface area (ECSA) of the platinum-containing nanoparticles, which is evaluated from the electricity amount resulting from hydrogen desorption from the platinum surface, is covered with at least one member selected from the group consisting of the polymer containing a melamine compound as a monomer and the thiol melamine compound.

Item 4. The electrochemical oxygen reduction catalyst according to any one of Items 1 to 3, wherein the polymer containing a melamine compound as a monomer is a polymer having a repeating unit represented by formula (1A):

(1A)

wherein $R^8$, $R^9$, $R^{10}$, and $R^{11}$ are the same or different, and represent hydrogen, hydroxy, halogen, substituted or unsubstituted alkyl, substituted or unsubstituted alkenyl, or substituted or unsubstituted aryl, and $R^{12a}$ represents substituted or unsubstituted arylene; or by formula (1B):

(1B)

wherein $R^{8a}$, $R^{9a}$, $R^{10a}$, and $R^{11a}$ are the same or different, and represent hydrogen, hydroxy, halogen, substituted or unsubstituted alkyl, substituted or unsubstituted alkenyl, or substituted or unsubstituted aryl, with the proviso that when at least one of $R^{8a}$, $R^{9a}$, $R^{10a}$, and $R^{11a}$ is substituted with sulfonic acid or a derivative group thereof (—$SO_3M$; M represents hydrogen, alkali metal, or $NH_4$), and $R^{12}$ represents substituted or unsubstituted alkylene, substituted or unsubstituted alkenylene, substituted or unsubstituted cycloalkylene, or substituted or unsubstituted arylene.

Item 5. The electrochemical oxygen reduction catalyst according to Item 4, wherein in formula (1A), all of $R^8$, $R^9$, $R^{10}$, and $R^{11}$ are hydrogen.

Item 6. The electrochemical oxygen reduction catalyst according to Item 4 or 5, wherein in formula (1B), at least one of $R^{8a}$, $R^{9a}$, $R^{10a}$ and $R^{11a}$ is alkyl substituted with sulfonic acid or a derivative group thereof (—$SO_3M$; M represents hydrogen, alkali metal, or $NH_4$), and the others are hydrogen.

Item 7. The electrochemical oxygen reduction catalyst according to any one of Items 4 to 6, wherein in formula (1B), $R^{12}$ is substituted or unsubstituted alkylene.

Item 8. The electrochemical oxygen reduction catalyst according to any one of Items 1 to 7, wherein in formula (2), all of $R^1$, $R^2$, $R^3$, $R^4$, $R^5$, and $R^6$ are hydrogen.

Item 9. The electrochemical oxygen reduction catalyst according to any one of Items 1 to 8, wherein in formula (2), $R^7$ is substituted or unsubstituted alkylene.

Item 10. The electrochemical oxygen reduction catalyst according to any one of Items 1 to 9, which is supported on a conductive carrier.

Item 11. The electrochemical oxygen reduction catalyst according to Item 10, wherein the conductive carrier is a carbonaceous material.

Item 12. The electrochemical oxygen reduction catalyst according to any one of Items 1 to 11, which is a cathode catalyst for fuel cells.

Item 13. An air electrode for fuel cells or metal-air batteries, using the electrochemical oxygen reduction catalyst according to any one of Items 1 to 12.

Item 14. A fuel cell using the air electrode according to Item 13 as a cathode.

Item 15. A metal-air battery using the air electrode according to Item 13 as a cathode.

Advantageous Effects of Invention

According to the present invention, an electrochemical oxygen reduction catalyst having not only high oxygen reduction activity (low overvoltage), but also high durability at 70 to 85° C., which are practical temperature conditions, can be provided.

DESCRIPTION OF EMBODIMENTS

In the present specification, "contain" and "comprise" include all the concepts of "comprise," "consist essentially of," and "consist of." In the present specification, the numerical range defined by A to B indicates A or more to B or less.

1. Electrochemical Oxygen Reduction Catalyst

The electrochemical oxygen reduction catalyst of the present invention is a catalyst used for electrochemically reducing oxygen, and contains platinum-containing nanoparticles and at least one member selected from the group consisting of a polymer containing a melamine compound as a monomer and a thiol melamine compound. More specifically, from the viewpoint of oxygen reduction activity, durability at 70 to 85° C., which are practical temperature conditions, etc., it is preferable that at least one member selected from the group consisting of the polymer containing a melamine compound as a monomer and the thiol melamine compound is supported on the platinum-containing nanoparticles. That is, it is preferable that the platinum-containing nanoparticles are covered with these compounds. The electrochemical oxygen reduction catalyst of the present invention may contain the polymer containing a melamine compound as a monomer and the thiol melamine compound singly or in a combination of two or more.

(1-1) Platinum-Containing Nanoparticles

As platinum-containing nanoparticles, a catalyst conventionally used for an air electrode for fuel cells can be used. Examples include platinum nanoparticles, platinum alloy nanoparticles, platinum-containing core-shell type nanoparticles, and the like.

When platinum alloy nanoparticles are used, an alloy of platinum and at least one of iron, nickel, manganese, copper, cobalt, chromium, titanium, ruthenium, rhodium, palladium, silver, iridium, and gold is preferable. In this case, the content of platinum in a platinum alloy is preferably 50 to 95 mass %, from the viewpoint of further reducing the overvoltage.

When platinum-containing core-shell type nanoparticles are used, it is preferable that the core portion is formed of a metal that is less expensive than platinum or an alloy of such a metal, and that the shell portion is formed of platinum, from the viewpoint of further reducing the overvoltage and the amount of platinum used. Examples of the platinum alloy in the core portion include those described above.

The average particle size of the above-described platinum-containing nanoparticles is not particularly limited. The use of nanoparticles having a small average particle size will increase the active surface area; however, platinum particles that are overly small cannot stably exist at 70 to 85° C., which are practical temperature conditions. From this point of view, the average particle size of the platinum-containing nanoparticles is preferably 2 nm to 40 nm, more preferably 2.4 nm to 30 nm, and even more preferably 3 nm to 20 nm. When platinum-containing core-shell type nanoparticles are used, the average thickness of the shell portion is preferably 1 to 3 atomic layers.

(1-2) Polymer Containing Melamine Compound as Monomer and Thiol Melamine Compound

[1-2-1] Polymer Containing Melamine Compound as Monomer

The polymer containing a melamine compound as a monomer is a polymer having a repeating unit represented by formula (1):

(1)

wherein $R^8$, $R^9$, $R^{10}$, and $R^{11}$ are the same or different, and represent hydrogen, hydroxy, halogen, substituted or unsubstituted alkyl, substituted or unsubstituted alkenyl, or substituted or unsubstituted aryl; and $R^{12}$ represents substituted or unsubstituted alkylene, substituted or unsubstituted alkenylene, substituted or unsubstituted cycloalkylene, or substituted or unsubstituted arylene, with the proviso that when none of $R^8$, $R^9$, $R^{10}$, and $R^{11}$ is substituted with sulfonic acid or a derivative group thereof ($—SO_3M$; M represents hydrogen, alkali metal, or $NH_4$), $R^{12}$ represents substituted or unsubstituted arylene.

When such a polymer containing a melamine compound as a monomer is used, durability at 70 to 85° C., which are practical temperature conditions, can be enhanced, and oxygen reduction activity can also be improved (overvoltage can be reduced).

In formula (1), examples of the halogen represented by $R^8$, $R^9$, $R^{10}$, and $R^{11}$ include fluorine, chlorine, bromine, iodine, and the like.

In formula (1), examples of the alkyl represented by $R^8$, $R^9$, $R^{10}$, and $R^{11}$ include lower alkyl, such as methyl, ethyl, n-propyl, isopropyl, n-butyl, isobutyl, sec-butyl, tert-butyl, n-pentyl, and n-hexyl (particularly, straight or branched alkyl having 1 to 10 carbon atoms, and more particularly 1 to 6 carbon atoms). The alkyl may have 1 to 6 (particularly 1 to 3) substituents, such as hydroxy, the halogen, amino, and sulfonic acid or a derivative group thereof ($—SO_3M$; M represents hydrogen, alkali metal, or $NH_4$). In particular, when the alkyl is substituted with sulfonic acid or a derivative group thereof ($—SO_3M$; M represents hydrogen, alkali metal, or $NH_4$), durability at 70 to 85° C., which are practical temperature conditions, can be further enhanced, and oxygen reduction activity can be further improved (overvoltage can be further reduced). In the sulfonic acid or a derivative group thereof, examples of the alkali metal represented by M include lithium, sodium, potassium, cesium, and the like. The sulfonic acid or a derivative group thereof is preferably a sulfonic acid group ($—SO_3H$), from the viewpoint of oxygen reduction activity, durability at 70 to 85° C., which are practical temperature conditions, etc.

In formula (1), examples of the alkenyl represented by $R^8$, $R^9$, $R^{10}$, and $R^{11}$ include lower alkenyl, such as vinyl, allyl, 2-butenyl, 3-butenyl, 1-methylallyl, 2-pentenyl, and 2-hexenyl (particularly, straight or branched alkenyl having 2 to 10 carbon atoms, and more particularly 2 to 6 carbon atoms). The alkenyl may have 1 to 6 (particularly 1 to 3) substituents, such as hydroxy, the halogen, amino, and the sulfonic acid or a derivative group thereof. In particular, when the alkenyl is substituted with the sulfonic acid or a derivative group thereof, durability at 70 to 85° C., which are practical temperature conditions, can be further enhanced, and oxygen reduction activity can be further improved (overvoltage can be further reduced).

In formula (1), examples of the aryl represented by $R^8$, $R^9$, $R^{10}$, and $R^{11}$ include aryl, such as phenyl, naphthyl, and anthracenyl (particularly aryl having 6 to 20 carbon atoms, more particularly 6 to 18 carbon atoms). The aryl may have 1 to 6 (particularly 1 to 3) substituents, such as hydroxy, the halogen, the alkyl, the alkenyl, amino, and the sulfonic acid or a derivative group thereof. In particular, when the aryl is substituted with the sulfonic acid or a derivative group thereof, durability at 70 to 85° C., which are practical temperature conditions, can be further enhanced, and oxygen reduction activity can be further improved (overvoltage can be further reduced).

In formula (1), from the viewpoint of further enhancing durability at 70 to 85° C., which are practical temperature conditions, and further improving oxygen reduction activity (further reducing overvoltage) to further reduce the amount of platinum used, $R^8$, $R^9$, $R^{10}$, and $R^{11}$ are preferably hydrogen, substituted or unsubstituted alkyl, substituted or unsubstituted alkenyl, or substituted or unsubstituted aryl; more preferably hydrogen, alkyl substituted with the sulfonic acid or a derivative group thereof, alkenyl substituted with the sulfonic acid or a derivative group thereof, aryl substituted with the sulfonic acid or a derivative group thereof, or the like; and even more preferably hydrogen, alkyl substituted with the sulfonic acid or a derivative group thereof, or the like. It is particularly preferable that all of $R^8$, $R^9$, $R^{10}$, and $R^{11}$ are hydrogen, from the viewpoint of synthesis.

In formula (1), examples of the alkylene represented by $R^{12}$ include lower alkylene, such as methylene, ethylene, ethylidene, trimethylene, propylene, propane-2,2-diyl, tetramethylene, methyltrimethylene, ethylethylene, and dimethylethylene (particularly straight or branched alkylene having 1 to 10 carbon atoms, more particularly 1 to 6 carbon atoms). The alkylene may have 1 to 6 (particularly 1 to 3) substituents, such as hydroxy, the halogen, the alkenyl, the aryl, and amino.

In formula (1), examples of the alkenylene represented by $R^{12}$ include lower alkenylene, such as vinylene, vinylidene, 1-methylvinylene, propenylene, 1-butenylene, and 2-butenylene (particularly straight or branched alkenylene having 2 to 10 carbon atoms, more particularly 2 to 6 carbon atoms). The alkenylene may have 1 to 6 (particularly 1 to 3) substituents, such as hydroxy, the halogen, the alkenyl, the aryl, and amino.

In formula (1), examples of the cycloalkylene represented by $R^{12}$ include cycloalkylene, such as cyclopropylene, cyclobutylene, cyclopentylene, cyclohexylene, decahydronaphthalene-2,6-diyl, and cyclohexene-1,2-diyl (particularly cycloalkylene having 6 to 20 carbon atoms, more particularly 6 to 18 carbon atoms). The cycloalkylene may have 1 to 6 (particularly 1 to 3) substituents, such as hydroxy, the halogen, the alkyl, the alkenyl, the aryl, and amino.

In formula (1), examples of the arylene represented by $R^{12}$ include arylene, such as phenylene, naphthylene, anthracenediyl, phenanthrenediyl, biphenyldiyl, and fluorenediyl (particularly arylene having 6 to 20 carbon atoms, more particularly 6 to 18 carbon atoms). The arylene may have 1 to 6 (particularly 1 to 3) substituents, such as hydroxy, the halogen, the alkyl, the alkenyl, the aryl, and amino.

In formula (1), $R^{12}$ is preferably substituted or unsubstituted alkylene, from the viewpoint of further enhancing durability at 70 to 85° C., which are practical temperature conditions, and further improving oxygen reduction activity (further reducing overvoltage) to further reduce the amount of platinum used.

In the present invention, in the polymer having a repeating unit represented by formula (1), the sulfonic acid or a derivative group thereof can be introduced into at least one of $R^8$, $R^9$, $R^{10}$, and $R^{11}$, or $R^{12}$ can be made a group difficult to desorb, thereby enhancing durability at 70 to 85° C., which are practical temperature conditions, and improving oxygen reduction activity (reducing overvoltage). That is, in formula (1), when none of $R^8$, $R^9$, $R^{10}$, and $R^{11}$ is substituted with the sulfonic acid or a derivative group thereof, $R^{12}$ is substituted or unsubstituted arylene.

In other words, the polymer having a repeating unit represented by formula (1) as described above is preferably a polymer having a repeating unit represented by formula (1A):

(1A)

wherein $R^8$, $R^9$, $R^{10}$, and $R^{11}$ are as defined above, and $R^{12a}$ represents substituted or unsubstituted arylene; or by formula (1B):

(1B)

wherein $R^{8a}$, $R^{9a}$, $R^{10a}$, and $R^{11a}$ are the same or different, and represent hydrogen, hydroxy, halogen, substituted or unsubstituted alkyl, substituted or unsubstituted alkenyl, or substituted or unsubstituted aryl, with the proviso that at least one of $R^{8a}$, $R^{9a}$, $R^{10a}$ and $R^{11a}$ is substituted with sulfonic acid or a derivative group thereof (—$SO_3M$; M represents hydrogen, alkali metal, or $NH_4$); and $R^{12}$ is as defined above.

In formula (1A), the arylene represented by $R^{12a}$ can be those mentioned above. The same applies to the type and number of substituents. Further, in formula (1B), the halogen, alkyl, alkenyl, and aryl represented by $R^{8a}$, $R^{9a}$, $R^{10a}$, and $R^{11a}$ can be those mentioned above. The same applies to the type and number of substituents. However, in formula (1B), at least one of $R^{8a}$, $R^{9a}$, $R^{10a}$, and $R^{11a}$ is substituted with the sulfonic acid or a derivative group thereof. In particular, from the viewpoint of enhancing durability, for example, at 70 to 85° C., which are practical temperature conditions, and improving oxygen reduction activity (reducing overvoltage) to further reduce the amount of platinum used, it is preferable that at least one of $R^{8a}$, $R^{9a}$, $R^{10a}$, and $R^{11a}$ is alkyl substituted with the sulfonic acid or a derivative group thereof, while the others are hydrogen; and it is more preferable that one of $R^{8a}$, $R^{9a}$, $R^{10a}$, and $R^{11a}$ is alkyl substituted with the sulfonic acid or a derivative group thereof, while the others are hydrogen. When $R^{8a}$, $R^{9a}$, $R^{10a}$, and $R^{11a}$ are substituted with the sulfonic acid or a derivative group thereof, the number of sulfonic acids or derivative groups thereof is not particularly limited, and may be 1 to 3, for example.

When a polymer having a repeating unit represented by formula (1A) is used as the polymer containing a melamine compound as a monomer, it is possible to enhance durability at 70 to 85° C., which are practical temperature conditions, and to improve oxygen reduction activity (reduce overvoltage). When a polymer having a repeating unit represented by formula (1B) is used, it is possible to enhance durability at 70 to 85° C., which are practical temperature conditions, and to improve oxygen reduction activity (reduce overvoltage).

Examples of repeating units satisfying the above conditions include and the like.

The polymer containing a melamine compound as a monomer may be, as a polymer formed only of a repeating unit represented by formula (1), a melamine resin represented by formula (3):

wherein $R^8$, $R^9$, $R^{10}$, $R^{11}$, and $R^{12}$ are as defined above, and n is an integer of 2 to 1000.

Typical examples of such a polymer include a sulfonated melamine condensate (melamine sulfonic acid) represented by the following formula (3A):

(3A)

wherein $R^8$, $R^9$, $R^{11}$, and $R^{12}$ are as defined above.

The polymerization degree of the polymer containing a melamine compound as a monomer (corresponding to n in the case of a melamine resin represented by formula (3)) is not particularly limited; however, the average (typical) polymerization degree is preferably 2 to 1000, and more preferably 3 to 500, from the viewpoint of further enhancing durability at 70 to 85° C., which are practical temperature conditions, and further improving redox activity (further reducing overvoltage) to further reduce the amount of platinum used.

The terminal group of the polymer containing a melamine compound as a monomer is not particularly limited. Examples include hydrogen, hydroxy, the above alkyl, the above alkenyl, the above aryl, and the like.

As the polymer containing a melamine compound as a monomer satisfying the above conditions, a known or commercially available product can be used.

[1-2-2] Thiol Melamine Compound

The thiol melamine compound is a thiol melamine compound represented by formula (2):

(2)

wherein $R^1$, $R^2$, $R^3$, $R^4$, $R^5$, and $R^6$ are the same or different, and represent hydrogen, hydroxy, halogen, substituted or unsubstituted alkyl, substituted or unsubstituted alkenyl, or substituted or unsubstituted aryl; and $R^7$ represents substituted or unsubstituted alkylene, substituted or unsubstituted alkenylene, substituted or unsubstituted cycloalkylene, or substituted or unsubstituted arylene.

When such a thiol melamine compound is used, durability at 70 to 85° C., which are practical temperature conditions, can be enhanced, and oxygen reduction activity can be improved (overvoltage can be reduced).

In formula (2), the halogen, alkyl, alkenyl, and aryl represented by $R^1$, $R^2$, $R^3$, $R^4$, $R^5$, and $R^6$ can be those mentioned above. The same applies to the type and number of substituents.

In formula (2), from the viewpoint of further enhancing durability, for example, at 70 to 85° C., which are practical temperature conditions, and further improving oxygen reduction activity (further reducing overvoltage) to further reduce the amount of platinum used, $R^1$, $R^2$, $R^3$, $R^4$, $R^5$, and $R^6$ are preferably hydrogen, substituted or unsubstituted alkyl, substituted or unsubstituted alkenyl, or substituted or unsubstituted aryl; more preferably hydrogen, alkyl substituted with the sulfonic acid or a derivative group thereof, alkenyl substituted with the sulfonic acid or a derivative group thereof, aryl substituted with the sulfonic acid or a derivative group thereof, or the like; and even more preferably hydrogen, alkyl substituted with the sulfonic acid or a derivative group thereof, or the like. It is particularly preferable that all of $R^1$, $R^2$, $R^3$, $R^4$, $R^5$, and $R^6$ are hydrogen, from the viewpoint of synthesis. $R^1$, $R^2$, $R^3$, $R^4$, $R^5$, and $R^6$ may be the same or different.

In formula (2), the alkylene, alkenylene, cycloalkylene, and arylene represented by $R^7$ can be those mentioned above. The same applies to the type and number of substituents.

In formula (2), $R^7$ is preferably substituted or unsubstituted alkylene, from the viewpoint of further enhancing durability at around 70 to 85° C., which are practical temperature conditions, and further improving oxygen reduction activity (further reducing overvoltage) to further reduce the amount of platinum used.

Examples of the thiol melamine compound satisfying the above conditions include and the like. The thiol melamine compound can be a known compound or may be synthesized separately.

In the electrochemical oxygen reduction catalyst of the present invention, the amounts of the polymer containing a melamine compound as a monomer and the thiol melamine compound are not particularly limited. For example, it is preferable to contain (particularly support) at least one member selected from the group consisting of the polymer containing a melamine compound as a monomer and the thiol melamine compound in an amount of 0.1 to 1000 parts by mass, and particularly preferably 0.5 to 800 parts by mass, relative to 100 parts by mass of the platinum-containing nanoparticles. In addition, it is preferable that 10 to 80%, and particularly 20 to 70% of the electrochemical active surface area (ECSA) of the platinum-containing nanoparticles, which is evaluated from the electricity amount resulting from hydrogen desorption from the platinum surface, is covered with at least one member selected from the group consisting of the polymer containing a melamine compound as a monomer and the thiol melamine compound. That is, the coverage of the platinum-containing nanoparticles by these compounds is preferably 10 to 80%, and particularly preferably 20 to 70%. When the polymer containing a melamine compound as a monomer and the thiol melamine compound are used in combination, the total amount thereof is preferably adjusted to be within the range mentioned above.

(1-3) Conductive Carrier

Supporting the platinum-containing nanoparticles on a conductive carrier further improves the conductivity, and reduces the platinum amount used. The conductive carrier is not particularly limited, as long as it is conventionally used as a conductive carrier of a catalyst for electrochemically reducing oxygen. Examples include carbonaceous materials such as carbon black (Ketjen black, furnace black, acetylene black, etc.), activated carbon, graphite, and glassy carbon; and conductive oxides such as tin and titanium. Of these, carbon black is preferable from the viewpoint of conductivity and surface area.

The shape of the conductive carrier is not particularly limited, and preferably follows the shape of the air electrode.

(1-4) Electrochemical Oxygen Reduction Catalyst

The shape of the electrochemical oxygen reduction catalyst of the present invention is not particularly limited, and preferably follows the shape of the air electrode.

Since the electrochemical oxygen reduction catalyst of the present invention has an oxygen reduction activity of reducing oxygen to water, it can be suitably used as a catalyst for electrodes of a cell using oxygen as an active material. Specifically, the electrochemical oxygen reduction catalyst of the present invention can be preferably used as an air electrode catalyst for fuel cells (particularly polymer electrolyte fuel cells, phosphoric acid fuel cells, etc.) or for metal-air batteries.

2. Method for Producing Electrochemical Oxygen Reduction Catalyst

The method for producing the electrochemical oxygen reduction catalyst of the present invention is not particularly limited. For example, by a method such as a solution-drying method, a coating method, or a gas phase method, at least one member selected from the group consisting of the polymer containing a melamine compound as a monomer and the thiol melamine compound can be supported on the platinum-containing nanoparticles.

For example, in the solution-drying method, platinum-containing nanoparticles (particularly platinum catalyst) and at least one member selected from the group consisting of the polymer containing a melamine compound as a monomer and the thiol melamine compound are dissolved or dispersed (suspended) beforehand in a solvent, followed by stirring, as necessary; thereby, at least one member selected from the group consisting of the polymer containing a melamine compound as a monomer and the thiol melamine compound is adsorbed on the platinum-containing nanoparticles (particularly platinum catalyst). Thereafter, as necessary, by filtering the resulting suspension to collect powders, the electrochemical oxygen reduction catalyst of the present invention can be obtained. In the coating method, after molding is performed using platinum-containing nanoparticles (particularly platinum catalyst) on the electrode, a solution containing at least one member selected from the group consisting of the polymer containing a melamine compound as a monomer and the thiol melamine compound can be applied. The platinum-containing nanoparticles can be supported on a conductive carrier by an ordinary method. By a similar method as above, the polymer containing a melamine compound as a monomer and the thiol melamine compound can also be supported on a catalyst in which the platinum-containing nanoparticles are supported on the conductive carrier.

Any solvent can be used without particular limitation as long as the platinum-containing nanoparticles, the polymer containing a melamine compound as a monomer, and the thiol melamine compound can be dissolved or dispersed (suspended) in the solvent. For example, organic solvents, such as acetone, toluene, methanol, ethanol, 1-propanol, 2-propanol, dichloromethane, tetrahydrofuran, acetonitrile, and dimethylformamide; and water, can be suitably used. These organic solvents and water can be used singly or in a combination of two or more.

The concentrations of the platinum-containing nanoparticles (particularly platinum catalyst) and at least one member selected from the group consisting of the polymer containing a melamine compound as a monomer and the thiol melamine compound are not particularly limited, and can be adjusted to the use amounts described above. For example, as a charged amount, the concentration of the platinum-containing nanoparticles (particularly platinum catalyst) is preferably 0.1 to 10.0 g/L, and more preferably 0.5 to 5.0 g/L. As a charged amount, the concentration of the polymer containing a melamine compound as a monomer and the thiol melamine compound in the solvent is preferably 0.02 to 3.0 g/L, and more preferably 0.05 to 1.5 g/L.

3. Air Electrode and Cell

The air electrode of the present invention is an air electrode for fuel cells (particularly polymer electrolyte fuel cells, phosphoric acid fuel cells, etc.) or for metal-air batteries using the electrochemical oxygen reduction catalyst of the present invention described above.

Such an air electrode can be similar to conventional air electrodes, except that the electrochemical oxygen reduction catalyst of the present invention is used as a catalyst. For example, the air electrode of the present invention can have an air electrode catalyst layer.

The thickness of the air electrode catalyst layer is not particularly limited, and is generally about 0.1 to 100 μm. The amount of the catalyst is also not particularly limited; and is, for example, about 0.01 to 20 mg/cm$^2$.

The method for forming the air electrode catalyst layer is not particularly limited. The air electrode catalyst layer can be produced by a method in which a catalyst ink prepared by mixing the electrochemical oxygen reduction catalyst of the present invention and a resin solution is applied to a gas diffusion layer or a current collector, and dried.

The other structure of the air electrode can be the same as those of known air electrodes. For example, the air electrode may have a structure in which a current collector such as carbon paper, carbon cloth, a metal mesh, a metal sintered body, a foam metal plate, or a metal porous body is disposed on the catalyst layer side of the air electrode; and a water-repellent film, a diffusion film, an air distribution layer, etc., are provided.

As the electrolyte, the electrochemical oxygen reduction catalyst of the present invention and a polymer electrolyte membrane can be unified by a known method for use. By applying, to an electrolyte membrane, a material obtained by dispersing the electrochemical oxygen reduction catalyst of the present invention and an electrolyte material, a carbon material, or the like, in water or a solvent; or by transferring a catalyst layer applied to a substrate to an electrolyte membrane, the catalyst layer can be formed on the electrolyte membrane.

Usable examples of the polymer electrolyte membrane include various perfluorocarbon-based, styrene-divinylbenzene copolymer-based, or polybenzimidazole-based ion exchange resin membranes; inorganic polymer ion exchange membranes; organic-inorganic composite polymer ion exchange membranes; etc.

The structure of the fuel electrode is not particularly limited, and the fuel electrode can have the same structure as that of a known polymer electrolyte fuel cell. As the catalyst for fuel electrodes, various conventionally known metals, metal alloys, and metal complexes can be used. Usable metal types include precious metals, such as platinum, palladium, iridium, rhodium, ruthenium, and gold used in conventional polymer electrolyte fuel cells (PEFCs), as well as base metals, such as nickel, silver, cobalt, iron, copper, and zinc. A single metal catalyst or a single metal complex selected from these metals, or an alloy or a metal complex composite composed of two or more metals in any combination, can be used. Further, a composite catalyst of a metal catalyst selected from the above and another metal oxide, and a supported catalyst in which catalyst fine particles are dispersed on a carrier such as a carbonaceous material or metal oxide can also be used.

By sandwiching both sides of the obtained membrane-electrode assembly with current collectors, such as carbon paper or carbon cloth, so that the membrane-electrode assembly is incorporated into a cell, a polymer electrolyte fuel cell can be produced.

On the other hand, when the catalyst is applied to a phosphoric acid fuel cell rather than a polymer electrolyte fuel cell, a phosphoric acid aqueous solution is immersed in various separators as an electrolyte solution rather than a polymer electrolyte membrane. The other components are the same as those of the polymer electrolyte fuel cell.

When the electrochemical oxygen reduction catalyst of the present invention is used for an air electrode of a metal-air battery, a metal such as zinc, aluminum, magnesium, or iron can be used as the metal anode of the metal-air battery. The specific structure of the metal anode can be the same as that of a known metal-air battery. The other components are the same as those of the polymer electrolyte fuel cell.

In cells having the above structure, oxygen or air can be supplied or spontaneously diffused to the air electrode side in any case. In fuel cells (in particular, polymer electrolyte fuel cells, phosphoric acid fuel cells, etc.), a substance serving as a fuel can be supplied to the fuel electrode side. As the fuel substance, other than hydrogen gas, alcohols such as methanol, ethanol, isopropanol, and ethylene glycol; or a solution of formic acid, borohydride, hydrazine, and sugar can be used.

The operating temperature in the case when the cell of the present invention is a fuel cell (particularly a polymer electrolyte fuel cell, phosphoric acid fuel cell, etc.) varies depending on the electrolyte used; however, it is usually about 0 to 250° C., and preferably about 10 to 80° C.

EXAMPLES

The present invention will be described in more detail below with reference to Examples and Comparative Examples. The present invention is not limited to the following Examples. The polymers containing a melamine compound as a monomer and the thiol melamine compound used herein were as follows.

Melamine resin (1) (Synthesis Example 1):

Melamine resin (2): Accerete 100 produced by Nissan Chemical Corporation (sulfonated melamine condensate)
Melamine resin (3): Poly(melamine-co-formaldehyde) methylated solution, produced by Sigma Aldrich Co., LLC (R: hydrogen or methyl)

Thiol melamine compound (Synthesis Example 2):

Synthesis Example 1: Melamine Resin (1)

Melamine resin (1) was synthesized in the following manner. 1-Methyl-2-pyrrolidinone as a reaction solvent was added to 1,3-phenylenediamine, followed by dissolution by stirring while substituting with nitrogen. Next, 2-amino-4,6-dichloro-1,3,5-triazine was added, followed by dissolution by stirring, and then potassium carbonate was added and dispersed by stirring for 15 minutes. After stirring in an oil bath at 150° C. for 85 hours, the mixture was cooled to room temperature, added dropwise to purified water (3000 mL) containing aqueous ammonia (28%, 30 mL), and stirred for 30 minutes. The precipitate was separated by filtration and washed 3 times with purified water (150 mL), after which methanol (450 mL) was added, and the mixture was stirred for 90 minutes. After removing the methanol by filtration, the resultant was washed 3 times with methanol (150 mL). Next, the resultant was dried and solidified under heating and reduced pressure (60° C.) to give a brown solid (yield: 54.4%).

1,3-Phenylenediamine

2-Amino-4,6-dichloro-1,3,5-triazine

Synthesis Example 2: Thiol Melamine Compound

Raw material 1 (2-chloro-4,6-diamino-1,3,5-triazine; 1.45 g, 10 mmol (produced by Tokyo Chemical Industry Co., Ltd.)) and raw material 2 (2-aminoethanethiol; 771 mg, 10 mmol (produced by Tokyo Chemical Industry Co., Ltd.)) were suspended and dissolved in 25 mL of water in an argon-filled reactor, and stirred and refluxed for 3 hours. The clear solution was filtered, 2 mL of water containing 0.4 g of sodium hydroxide was added, and the mixture was stirred and refluxed for another 1 hour. After that, the reaction liquid was returned to room temperature, and the solid obtained by filtration was thoroughly washed with water and then vacuum-dried well, thereby obtaining a target thiol melamine compound. In measurement by ASAP-MS (atmospheric solids analysis probe mass spectrometry), a peak of m/z 187, an ion of the product molecule $^+$H, was observed, confirming the synthesis of the target product. In addition, a $^1$HNMR peak derived from amino, which was different from raw material 1, was observed at 5.9 to 6.7 ppm, confirming the synthesis of the target product.

Raw Material 1
(2-chloro-4,6-diamino-1,3,5-triazine)

Raw Material 2 (2-aminoethanethiol)

Example 1: Durability Test Using Melamine Resin (1)

A platinum catalyst (5 mg) (produced by Tanaka Kikinzoku Kogyo, TEC10E50E, average particle size: 2 to 3 nm) was suspended in a mixed solvent of ultrapure water (5.14 mL) and 2-propanol (1.62 mL). The suspension (3.6 μL) was added dropwise to a 3-mm-diameter glassy carbon electrode (area: 0.0707 cm$^2$) produced by BAS Inc., followed by drying.

Using the three-electrode method, specifically, using the catalyst modified electrode as a working electrode, a reversible hydrogen electrode as a reference electrode, and a platinum coil as a counter-electrode, an electrochemical measurement was performed. As an electrolyte solution, a 0.1M perchloric acid aqueous solution was used. First, cyclic voltammetry was performed under argon atmosphere, and then the gas atmosphere was changed to oxygen to perform linear sweep voltammetry from the low-potential side. Thus, the oxygen reduction activity obtained when the catalyst free of a melamine resin and a thiol melamine compound was used was evaluated.

Next, the electrode was taken out, and immersed in a pyridine solution (0.7 mmol/L) of melamine resin (1) for 10 minutes so that melamine resin (1) was adsorbed on the platinum catalyst. Thereafter, the same measurement as before immersion was performed again. By this measurement, the oxygen reduction activity of the catalyst in which melamine resin (1) is supported on platinum can be evaluated. In this case, the coverage of the platinum catalyst by melamine resin (1) calculated from the ECSA was 65%.

Further, 3.6 μL of a Nafion solution (a solution obtained by adding 27 μL of Nafion (Aldrich 5 wt %) to a mixed solvent of water (5.14 mL) and 2-propanol (1.62 mL)) was added dropwise to the catalyst modified electrode in which melamine resin (1) was supported, and dried at room temperature. The resulting electrode was used as a working electrode, a reversible hydrogen electrode as a reference electrode, and a platinum coil as a counter-electrode. As an electrolyte solution, a 0.1M perchloric acid aqueous solution was used. Using the three-electrode method, a durability test was performed by applying a square wave potential cycle of holding the working electrode at 0.6 V for 3 seconds and 1.0 V for 3 seconds for 10000 cycles at 77° C. Thereafter, the same measurement as before immersion was performed. By this measurement, the oxygen reduction activity after the durability test when using the catalyst containing melamine resin (1) can be evaluated.

As an index of activity, the mass activity per gram of platinum was used. The value of mass activity was calculated from the following formula:

Mass activity=[1/(amount (g) of platinum on electrode)]×(current value at 0.9 V)(current value at 0.38 V)/[(current value at 0.38 V)−(current value at 0.9 V)]

In the above calculation formula, the current value at 0.38 V represents the upper current value limited by mass transfer, and the value of mass activity reflects only the catalyst activity without the effect of mass transfer.

Figure 1:
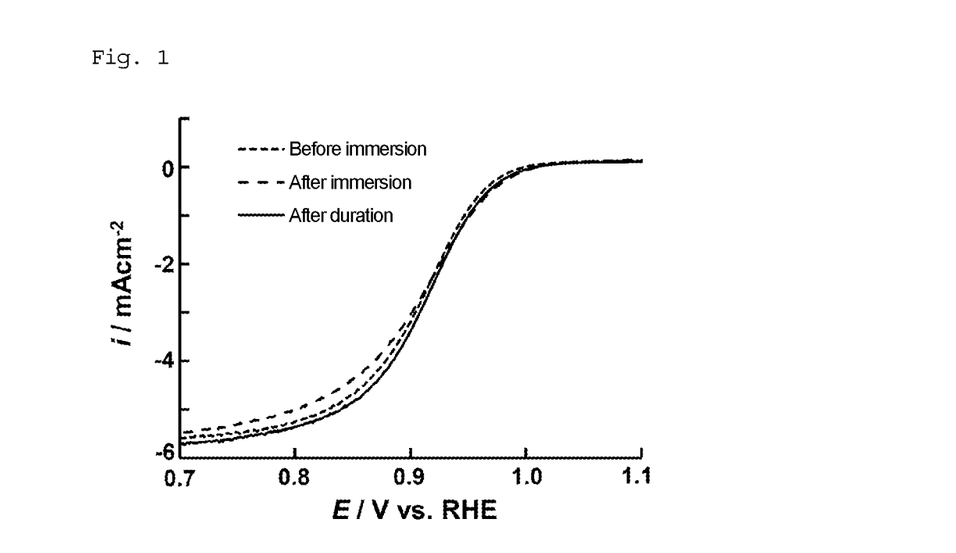
FIG. 1 is a linear sweep voltammogram showing the results of Example 1 (durability test using melamine resin (1)).

The results are shown in FIG. 1. As shown in FIG. 1, the mass activity at a potential of 0.9 V vs RHE was 410 $Ag_{Pt}^{-1}$ before immersion (before supporting melamine resin (1)), and 371 $Ag_{Pt}^{-1}$ after immersion (after supporting melamine resin (1)). However, it was 450 $Ag_{Pt}^{-1}$ after the durability test, and the mass activity at a potential of 0.9 V vs RHE after the durability test could be maintained at about 110%. Deterioration was suppressed by the durability test, and the redox activity could be kept high and the overvoltage could be kept low.

Example 2: Durability Test Using Melamine Resin (2)

A platinum catalyst (5 mg) (produced by Tanaka Kikinzoku Kogyo, TEC10E50E, average particle size: 2 to 3 nm) was suspended in a mixed solvent of ultrapure water (5.14 mL) and 2-propanol (1.62 mL). The suspension (3.6 µL) was added dropwise to a 3-mm-diameter glassy carbon electrode (area: 0.0707 cm$^2$) produced by BAS Inc., followed by drying.

Using the three-electrode method, specifically, using the catalyst modified electrode as a working electrode, a reversible hydrogen electrode as a reference electrode, and a platinum coil as a counter-electrode, an electrochemical measurement was performed. As an electrolyte solution, a 0.1M perchloric acid aqueous solution was used. First, cyclic voltammetry was performed under argon atmosphere, and then the gas atmosphere was changed to oxygen to perform linear sweep voltammetry from the low-potential side. Thus, the oxygen reduction activity obtained when the catalyst free of a melamine resin and a thiol melamine compound was used was evaluated.

Next, a solution (0.027 mL) obtained by diluting 5 times melamine resin (2) with pure water was added to a mixed solvent of ultrapure water (5.14 mL) and 2-propanol (1.62 mL). Then, the electrode used for the above evaluation was taken out, and the melamine resin (2) solution (3.6 µL) prepared as described above was applied to the electrode (area: 0.0707 cm$^2$) and dried. Using the resulting electrode, the same measurement as before coating was performed again. By this measurement, the oxygen reduction activity of the catalyst in which melamine resin (2) is supported on platinum can be evaluated. In this case, the coverage of the platinum catalyst by melamine resin (2) calculated from the ECSA was 47%.

Further, 3.6 µL of a Nafion solution (a solution obtained by adding 27 µL of Nafion (Aldrich 5 wt %) to a mixed solvent of water (5.14 mL) and 2-propanol (1.62 mL)) was added dropwise to the catalyst modified electrode in which melamine resin (2) was supported, and dried at room temperature. The resulting electrode was used as a working electrode, a reversible hydrogen electrode as a reference electrode, and a platinum coil as a counter-electrode. As an electrolyte solution, a 0.1M perchloric acid aqueous solution was used. Using the three-electrode method, a durability test was performed by applying a square wave potential cycle of holding the working electrode at 0.6 V for 3 seconds and 1.0 V for 3 seconds for 10000 cycles at 77° C. Thereafter, the same measurement as before immersion was performed. By this measurement, the oxygen reduction activity after the durability test when using the catalyst containing melamine resin (2) can be evaluated. As an index of activity, the mass activity per gram of platinum was used, as in Example 1.

Figure 2:
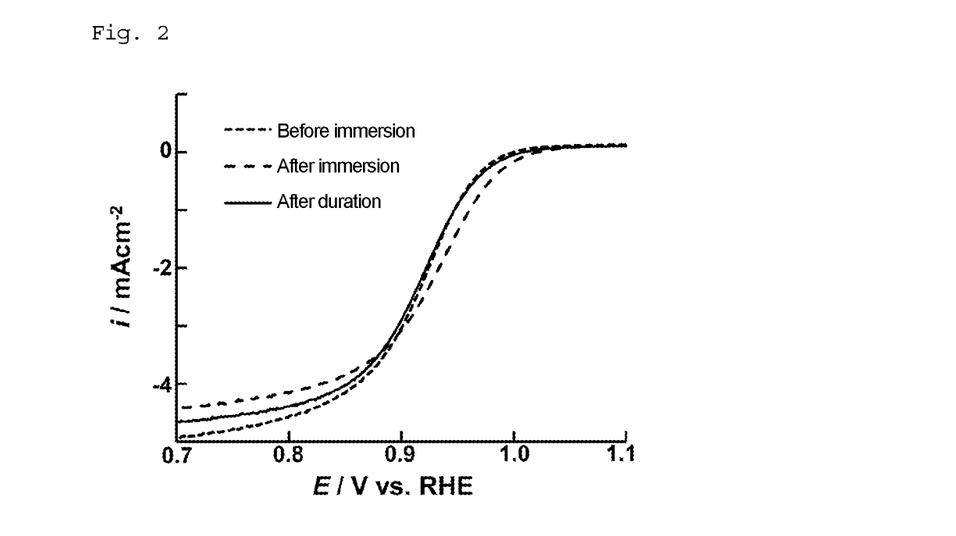
FIG. 2 is a linear sweep voltammogram showing the results of Example 2 (durability test using melamine resin (2)).

The results are shown in FIG. 2. As shown in FIG. 2, the mass activity at a potential of 0.9 V vs RHE was 409 $Ag_{Pt}^{-1}$ before immersion (before supporting melamine resin (2)), and 501 $Ag_{Pt}^{-1}$ after immersion (after supporting melamine resin (2)). However, it was 397 $Ag_{Pt}^{-1}$ after the durability test, and the mass activity at a potential of 0.9 V vs RHE could be maintained at about 97% after the durability test. Deterioration was suppressed by the durability test, and the redox activity could be kept high and the overvoltage could be kept low.

Example 3: Durability Test Using Thiol Melamine Compound

A platinum catalyst (5 mg) (produced by Tanaka Kikinzoku Kogyo, TEC10E50E, average particle size: 2 to 3 nm) was suspended in a mixed solvent of ultrapure water (5.14 mL) and 2-propanol (1.62 mL). The suspension (3.6 µL) was added dropwise to a 3-mm-diameter glassy carbon electrode (area: 0.0707 cm$^2$) produced by BAS Inc., followed by drying.

Using the three-electrode method, specifically, using the catalyst modified electrode as a working electrode, a reversible hydrogen electrode as a reference electrode, and a platinum coil as a counter-electrode, an electrochemical measurement was performed. As an electrolyte solution, a 0.1M perchloric acid aqueous solution was used. First, cyclic voltammetry was performed under argon atmosphere, and then the gas atmosphere was changed to oxygen to perform linear sweep voltammetry from the low-potential side. Thus, the oxygen reduction activity obtained when the catalyst free of a melamine resin and a thiol melamine compound was used was evaluated.

Next, the electrode was taken out, and immersed in an acetone solution (0.7 mmol/L) of a thiol melamine compound for 10 minutes so that the thiol melamine compound was adsorbed on the platinum catalyst. Thereafter, the same measurement as before immersion was performed again. By this measurement, the oxygen reduction activity of the catalyst in which the thiol melamine compound is supported on platinum can be evaluated. In this case, the coverage of the platinum catalyst by the thiol melamine compound calculated from the ECSA was 47%.

Further, 3.6 µL of a Nafion solution (a solution obtained by adding 27 µL of Nafion (Aldrich 5 wt %) to a mixed solvent of water (5.14 mL) and 2-propanol (1.62 mL)) was added dropwise to the catalyst modified electrode in which the thiol melamine compound was supported, and dried at room temperature. The resulting electrode was used as a working electrode, a reversible hydrogen electrode as a reference electrode, and a platinum coil as a counter-electrode. As an electrolyte solution, a 0.1M perchloric acid aqueous solution was used. Using the three-electrode method, a durability test was performed by applying a square wave potential cycle of holding the working electrode at 0.6 V for 3 seconds and 1.0 V for 3 seconds for 2800 cycles at 77° C. Thereafter, the same measurement as before immersion was performed. By this measurement, the oxygen reduction activity after the durability test when using the catalyst containing a thiol melamine compound can be evaluated. As an index of activity, the mass activity per gram of platinum was used, as in Example 1.

Figure 3:
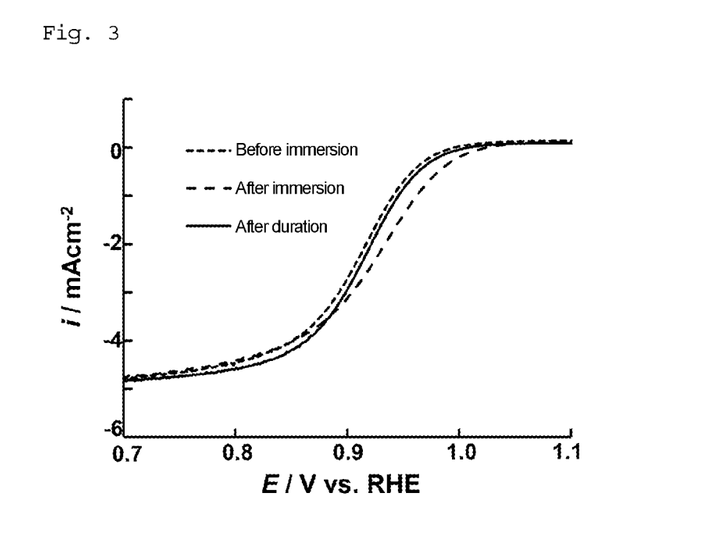
FIG. 3 is a linear sweep voltammogram showing the results of Example 3 (durability test using a thiol melamine compound).

The results are shown in FIG. 3. As shown in FIG. 3, the mass activity at a potential of 0.9 V vs RHE was 330 $Ag_{Pt}^{-1}$ before immersion (before supporting the thiol melamine compound), and 468 $Ag_{Pt}^{-1}$ after immersion (after supporting the thiol melamine compound). However, it was 401 $Ag_{Pt}^{-1}$ after the durability test, and the mass activity at a potential of 0.9 V vs RHE could be maintained at about 120% after the durability test. Deterioration was suppressed by the durability test, and the redox activity could be kept high and the overvoltage could be kept low.

Comparative Example 1: Durability Test Using Non-Supported Platinum Catalyst

A platinum catalyst (5 mg) (produced by Tanaka Kikinzoku Kogyo, TEC10E50E, average particle size: 2 to 3 nm) was suspended in a mixed solvent of ultrapure water (5.14 mL) and 2-propanol (1.62 mL). The suspension (3.6 µL) was added dropwise to a 3-mm-diameter glassy carbon electrode (area: 0.0707 cm$^2$) produced by BAS Inc., followed by drying.

Using the three-electrode method, specifically, using the catalyst modified electrode as a working electrode, a reversible hydrogen electrode as a reference electrode, and a platinum coil as a counter-electrode, an electrochemical measurement was performed. As an electrolyte solution, a 0.1M perchloric acid aqueous solution was used. First, cyclic voltammetry was performed under argon atmosphere, and then the gas atmosphere was changed to oxygen to perform linear sweep voltammetry from the low-potential side. At this time, the electrode was rotated at 1600 rpm. Thus, the oxygen reduction activity obtained when the catalyst free of a melamine resin and a thiol melamine compound was used was evaluated.

Next, 3.6 µL of a Nafion solution (a solution obtained by adding 27 µL of Nafion (Aldrich 5 wt %) to a mixed solvent of water (5.14 mL) and 2-propanol (1.62 mL)) was added dropwise to the catalyst modified electrode and dried at room temperature. The resulting electrode was used as a working electrode, a reversible hydrogen electrode as a reference electrode, and a platinum coil as a counter-electrode. As an electrolyte solution, a 0.1M perchloric acid aqueous solution was used. Using the three-electrode method, a durability test was performed by applying a square wave potential cycle of holding the working electrode at 0.6 V for 3 seconds and 1.0 V for 3 seconds for 2800 or 10000 cycles at 77° C. Thereafter, as in the above, cyclic voltammetry was performed under argon atmosphere, and then the gas atmosphere was changed to oxygen to perform linear sweep voltammetry from the low-potential side. Thus, the oxygen reduction activity after the durability test when using the catalyst free of a melamine resin and a thiol melamine compound was evaluated. As an index of activity, the mass activity per gram of platinum was used, as in Example 1.

Figure 4:
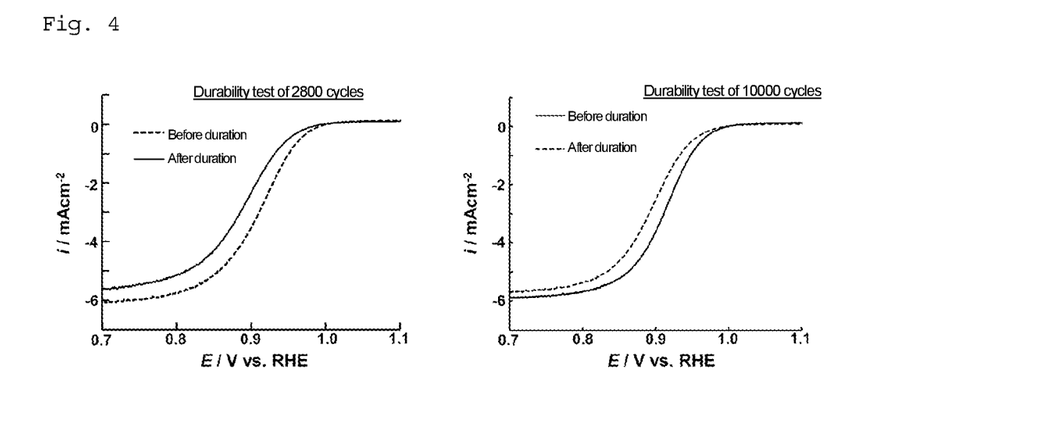
FIG. 4 is a linear sweep voltammogram showing the results of Comparative Example 1 (durability test using a non-supported platinum catalyst).

The results are shown in FIG. 4. As shown in FIG. 4, the mass activity per gram of platinum calculated from the current at a potential of 0.9 V vs RHE in the durability test of 2800 cycles was 468 $Ag_{Pt}^{-1}$ before the durability test, and 225 $Ag_{Pt}^{-1}$ after the durability test. In the durability test of 10000 cycles, the mass activity per gram of platinum was 532 $Ag_{Pt}^{-1}$ before the durability test, and 257 $Ag_{Pt}^{-1}$ after the durability test. In either case, the mass activity at a potential of 0.9 V vs RHE was about 48% after the durability test. Due to the deterioration caused by the durability test, the redox activity became low and the overvoltage became high.

Comparative Example 2: Durability Test Using Melamine Resin (3)

A platinum catalyst (5 mg) (produced by Tanaka Kikinzoku Kogyo, TEC10E50E, average particle size: 2 to 3 nm) was suspended in a mixed solvent of ultrapure water (5.14 mL) and 2-propanol (1.62 mL). The suspension (3.6 µL) was added dropwise to a glassy carbon electrode (surface area: 0.0707 cm$^2$) produced by BAS Inc., followed by drying.

Using the three-electrode method, specifically, using the catalyst modified electrode as a working electrode, a reversible hydrogen electrode as a reference electrode, and a platinum coil as a counter-electrode, an electrochemical measurement was performed. As an electrolyte solution, a 0.1M perchloric acid aqueous solution was used. First, cyclic voltammetry was performed under argon atmosphere, and then the gas atmosphere was changed to oxygen to perform linear sweep voltammetry from the low-potential side. Thus, the oxygen reduction activity obtained when the catalyst free of a melamine resin and a thiol melamine compound was used was evaluated.

Next, a 5% butanol solution (0.027 mL) of melamine resin (3) was added to a mixed solvent of ultrapure water (5.14 mL) and 2-propanol (1.62 mL). Then, the electrode was taken out, and the thus-prepared melamine resin (3) diluted solution (3.6 µL) was added dropwise on the taken out electrode. Thereafter, the same measurement as before immersion was performed again. By this measurement, the oxygen reduction activity of the catalyst in which melamine resin (3) is supported on platinum can be evaluated. In this case, the coverage of the platinum catalyst by melamine resin (3) calculated from the ECSA was 47%.

Further, 3.6 µL of a Nafion solution (a solution obtained by adding 27 µL of Nafion (Aldrich 5 wt %) to a mixed solvent of water (5.14 mL) and 2-propanol (1.62 mL)) was added dropwise to the catalyst modified electrode in which melamine resin (3) was supported, and dried at room temperature. The resulting electrode was used as a working electrode, a reversible hydrogen electrode as a reference electrode, and a platinum coil as a counter-electrode. As an electrolyte solution, a 0.1M perchloric acid aqueous solution was used. Using the three-electrode method, a durability test was performed by applying a square wave potential cycle of holding the working electrode at 0.6 V for 3 seconds and 1.0 V for 3 seconds for 2800 and 10000 cycles at 77° C. Thereafter, the same measurement as before immersion was performed. By this measurement, the oxygen reduction activity after the durability test when using the catalyst containing melamine resin (3) can be evaluated. As an index of activity, the mass activity per gram of platinum was used, as in Example 1.

Figure 5:
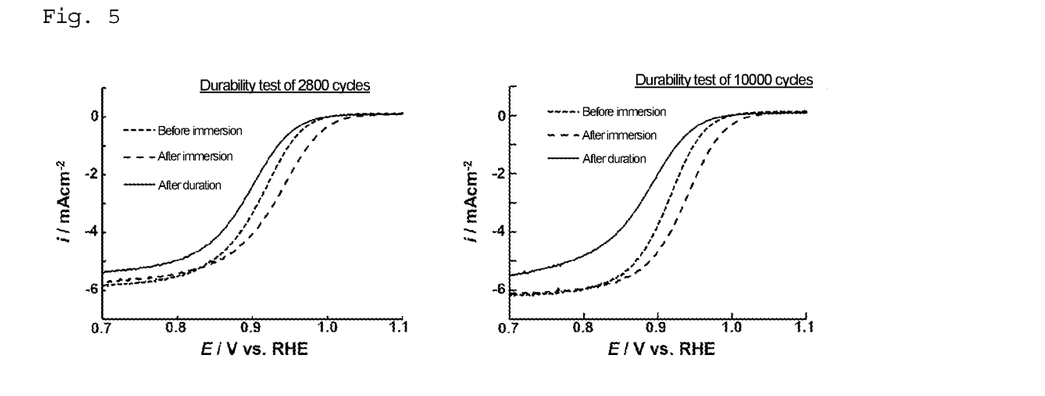
FIG. 5 is a linear sweep voltammogram showing the results of Comparative Example 2 (durability test using melamine resin (3)).

The results are shown in FIG. 5. As shown in FIG. 5, the mass activity at a potential of 0.9 V vs RHE in the durability test of 2800 cycles was 440 $Ag_{Pt}^{-1}$ before immersion (before supporting melamine resin (3)), and 739 $Ag_{Pt}^{-1}$ after immersion (after supporting melamine resin (3)); however, it was 239 $Ag_{Pt}^{-1}$ after the durability test. In the durability test of 10000 cycles, the mass activity was 541 $Ag_{Pt}^{-1}$ before immersion (before supporting melamine resin (3)), and 1036 $Ag_{Pt}^{-1}$ after immersion (after supporting melamine resin (3)); however, it was 176 $Ag_{Pt}^{-1}$ after the durability test. After the durability test, the mass activity at a potential of 0.9 V vs RHE was each about 54% and about 32%. Due to the deterioration caused by the durability test, the redox activity became low and the overvoltage became high.

INDUSTRIAL APPLICABILITY

The electrochemical oxygen reduction catalyst of the present invention can be used for an air electrode (cathode) of fuel cells, metal-air batteries, etc.

The invention claimed is:

1. An electrochemical oxygen reduction catalyst comprising platinum-containing nanoparticles and at least one member selected from the group consisting of a polymer containing a melamine compound as a monomer and a thiol melamine compound;

the polymer containing a melamine compound as a monomer being a polymer having a repeating unit represented by formula (1):

wherein
$R^8$, $R^9$, $R^{10}$, and $R^{11}$ are the same or different, and represent hydrogen, hydroxy, halogen, substituted or unsubstituted alkyl, substituted or unsubstituted alkenyl, or substituted or unsubstituted aryl, and
$R^{12}$ represents substituted or unsubstituted alkylene, substituted or unsubstituted alkenylene, substituted or unsubstituted cycloalkylene, or substituted or unsubstituted arylene, with the proviso that when none of $R^8$, $R^9$, $R^{10}$, and $R^{11}$ is substituted with sulfonic acid or a derivative group of formula —$SO_3M$, wherein M is an alkali metal or $NH_4$, $R^{12}$ represents substituted or unsubstituted arylene; and
the thiol melamine compound being a thiol melamine compound represented by formula (2):

wherein
$R^1$, $R^2$, $R^3$, $R^4$, $R^5$, and $R^6$ are the same or different, and represent hydrogen, hydroxy, halogen, substituted or unsubstituted alkyl, substituted or unsubstituted alkenyl, or substituted or unsubstituted aryl, and
$R^7$ represents substituted or unsubstituted alkylene, substituted or unsubstituted alkenylene, substituted or unsubstituted cycloalkylene, or substituted or unsubstituted arylene.

2. The electrochemical oxygen reduction catalyst according to claim 1, wherein at least one member selected from the group consisting of the polymer containing a melamine compound as a monomer and the thiol melamine compound is supported on the platinum-containing nanoparticles.

3. The electrochemical oxygen reduction catalyst according to claim 2, wherein 10 to 80% of the electrochemical active surface area (ECSA) of the platinum-containing nanoparticles, which is evaluated from the electricity amount resulting from hydrogen desorption from the platinum surface, is covered with at least one member selected from the group consisting of the polymer containing a melamine compound as a monomer and the thiol melamine compound.

4. The electrochemical oxygen reduction catalyst according to claim 1, wherein the polymer containing a melamine compound as a monomer is a polymer having a repeating unit represented by formula (1A):

wherein
$R^8$, $R^9$, $R^{10}$, and $R^{11}$ are the same or different, and represent hydrogen, hydroxy, halogen, substituted or unsubstituted alkyl, substituted or unsubstituted alkenyl, or substituted or unsubstituted aryl, and
$R^{12a}$ represents substituted or unsubstituted arylene; or by formula (1B):

wherein
$R^{8a}$, $R^{9a}$, $R^{10a}$, and $R^{11a}$ are the same or different, and represent hydrogen, hydroxy, halogen, substituted or unsubstituted alkyl, substituted or unsubstituted alkenyl, or substituted or unsubstituted aryl, with the proviso that when at least one of $R^{8a}$, $R^{9a}$, $R^{10a}$ and $R^{11a}$ is substituted with sulfonic acid or a derivative group of formula —$SO_3M$, wherein M is an alkali metal or $NH_4$, $R^{12}$ represents substituted or unsubstituted alkylene, substituted or unsubstituted alkenylene, substituted or unsubstituted cycloalkylene, or substituted or unsubstituted arylene.

5. The electrochemical oxygen reduction catalyst according to claim 4, wherein in formula (1A), all of $R^8$, $R^9$, $R^{10}$, and $R^{11}$ are hydrogen.

6. The electrochemical oxygen reduction catalyst according to claim 4, wherein in formula (1B), at least one of $R^{8a}$, $R^{9a}$, $R^{10a}$, and $R^{11a}$ is alkyl substituted with sulfonic acid or a derivative group of formula —$SO_3M$, wherein M is an alkali metal or $NH_4$, and the others are hydrogen.

7. The electrochemical oxygen reduction catalyst according to claim 4, wherein in formula (1B), $R^{12}$ is substituted or unsubstituted alkylene.

8. The electrochemical oxygen reduction catalyst according to claim 1, wherein in formula (2), all of $R^1$, $R^2$, $R^3$, $R^4$, $R^5$, and $R^6$ are hydrogen.

9. The electrochemical oxygen reduction catalyst according to claim 1, wherein in formula (2), $R^7$ is substituted or unsubstituted alkylene.

10. The electrochemical oxygen reduction catalyst according to claim 1, which is supported on a conductive carrier.

11. The electrochemical oxygen reduction catalyst according to claim 10, wherein the conductive carrier is a carbonaceous material.

12. The electrochemical oxygen reduction catalyst according to claim 1, which is a cathode catalyst for fuel cells.

13. An air electrode for fuel cells or metal-air batteries, using the electrochemical oxygen reduction catalyst according to claim 1.

14. A fuel cell using the air electrode according to claim 13 as a cathode.

15. A metal-air battery using the air electrode according to claim 13 as a cathode.

* * * * *